(12) United States Patent  
Thadikaran et al.

(10) Patent No.: US 9,183,390 B2  
(45) Date of Patent: Nov. 10, 2015

(54) SYSTEMS AND METHODS FOR PROVIDING ANTI-MALWARE PROTECTION ON STORAGE DEVICES

(75) Inventors: Paul J. Thadikaran, Rancho Cordova, CA (US); Adam Greer Wright, Corrales, NM (US); Thomas R. Bowen, Albuquerque, NM (US); Janet Yabeny Sholar, Rio Rancho, NM (US); Reginald D. Nepomuceno, Placitas, NM (US); Nicholas D. Triantafillou, Portland, OR (US); Richard Paul Mangold, Forrest Grove, OR (US); Darren Lasko, Forest, VA (US); Anand S. Ramalingam, Beaverton, OR (US); Paritosh Saxena, Portland, OR (US); Unnikrishnan Jayakumar, Folsom, CA (US); William B. Lindquist, Rio Rancho, NM (US); John A. List, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 13/976,373

(22) PCT Filed: Dec. 22, 2011

(86) PCT No.: PCT/US2011/067015  
§ 371 (c)(1),  
(2), (4) Date: Jun. 26, 2013

(87) PCT Pub. No.: WO2013/095565  
PCT Pub. Date: Jun. 27, 2013

(65) Prior Publication Data  
US 2013/0283381 A1    Oct. 24, 2013

(51) Int. Cl.  
*G06F 21/56*    (2013.01)

(52) U.S. Cl.  
CPC ..................................... *G06F 21/56* (2013.01)

(58) Field of Classification Search  
CPC combination set(s) only.  
See application file for complete search history.

(56) References Cited

U.S. PATENT DOCUMENTS

| 6,357,008 | B1 * | 3/2002 | Nachenberg | 726/24 |
| 7,739,724 | B2 * | 6/2010 | Durham et al. | 726/3 |
| 8,881,282 | B1 * | 11/2014 | Aziz et al. | 726/24 |
| 2006/0143362 | A1 * | 6/2006 | Li et al. | 711/100 |
| 2006/0184717 | A1 * | 8/2006 | Rothman et al. | 711/103 |
| 2009/0178141 | A1 * | 7/2009 | Panasyuk | 726/24 |

* cited by examiner

*Primary Examiner* — Beemnet Dada  
(74) *Attorney, Agent, or Firm* — Nicholson De Vos Webster & Elliot LLP

(57) ABSTRACT

Systems and methods for providing anti-malware protection on storage devices are described. In one embodiment, a storage device includes a controller, firmware, and memory. The firmware communicates with an authorized entity (e.g., external entity, operating system) to establish a secure communication channel. The system includes secure storage to securely store data.

18 Claims, 11 Drawing Sheets

SYSTEMS AND METHODS FOR PROVIDING ANTI-MALWARE PROTECTION ON STORAGE DEVICES

CROSS-REFERENCE TO RELATED APPLICATION

This patent application is a U.S. National Phase Application under 35 U.S.C. §371 of International Application No. PCT/US2011/067015, filed Dec. 22, 2011, entitled SYSTEMS AND METHODS FOR PROVIDING ANTI-MALWARE PROTECTION ON STORAGE DEVICES.

TECHNICAL FIELD

The present disclosure relates to systems and methods for providing anti-malware protection on storage devices.

BACKGROUND

Security is an important problem for any compute platform having data that resides in storage. A rootkit is software that enables continued privileged access to a computer while actively hiding its presence from administrators by subverting standard operating system (OS) functionality or other applications. Rootkit drivers modify the data that is made available to all applications and the OS. Malware threats are growing at an exponential rate. Malware (e.g., low level malware like rootkits) is getting stealthier and is attacking the host (personal computer) system stack far below the protection provided by anti-virus/anti-malware (AV/AM) approaches. Once low level malware has infected the system, a state of the system as seen by AV/AM approach is in control of the malware.

The AV/AM approaches provided by independent software vendor (ISV) applications have no mechanism to detect if the data that the ISV application is operating on is the actual data on storage. The data could be modified by a driver stack between storage and the application. This is called a lack of trusted reads. Also, the ISV applications have no mechanism to detect if the data it is writing to the storage has been committed to storage. The data could be modified, redirected or "swallowed" by the driver stack between storage and the application. This is called a lack of trusted writes. There is typically no secure storage available to AV/AM approaches.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Systems and methods for providing anti-malware protection on storage devices are described. Embodiments of the invention provide security features with enhanced firmware of a storage device in response to the security problem posed by malware and rootkits.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like. The interconnect between chips each could be point-to-point or each could be in a multi-drop arrangement, or some could be point-to-point while others are a multi-drop arrangement.

Figure 1:
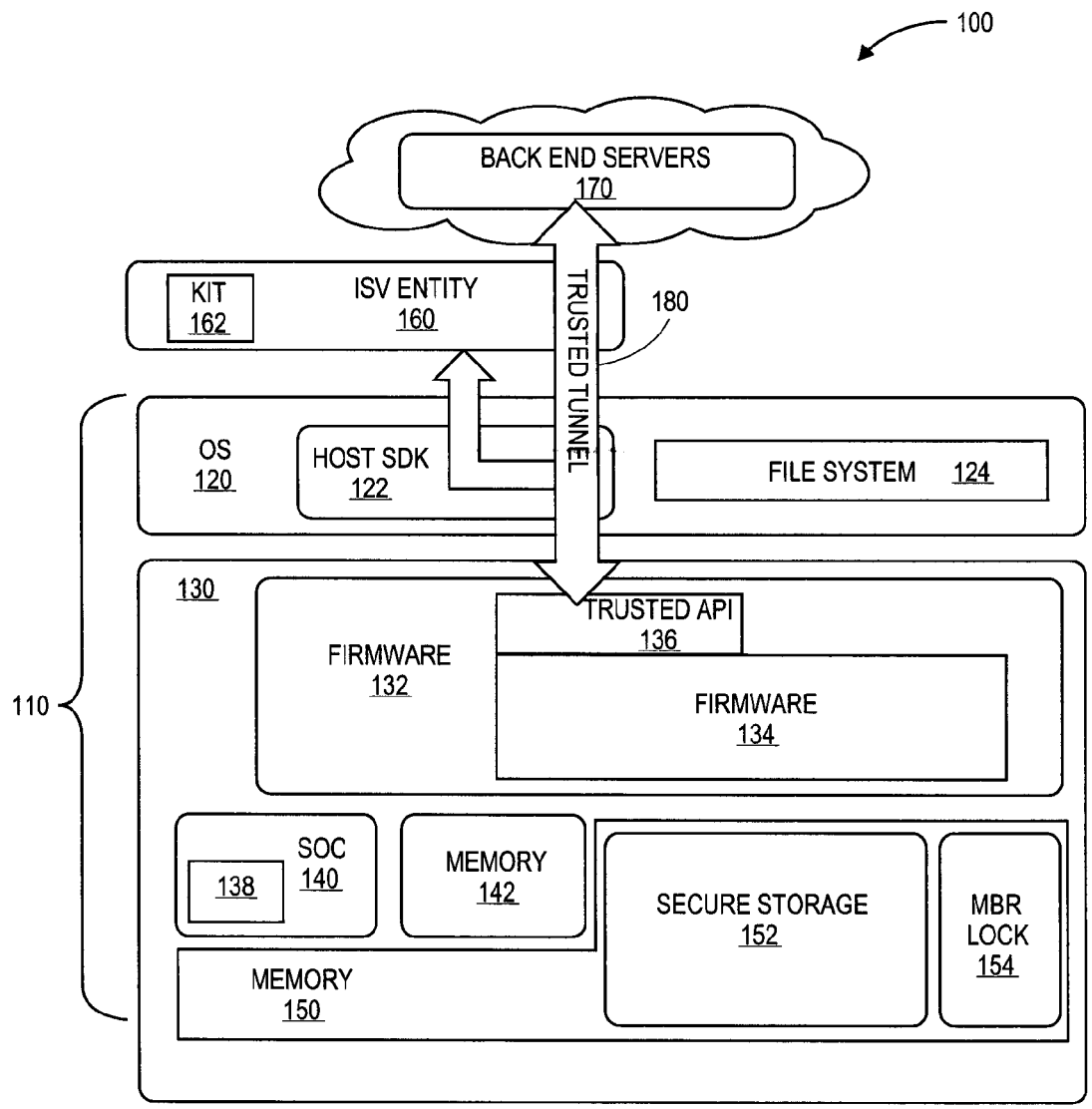
FIG. 1 illustrates a system having a security features in accordance with one embodiment of the invention.

FIG. 1 illustrates a system having security features in accordance with one embodiment of the invention. A trusted tunnel 180 is established between the host OS 120, the storage device 130, the ISV entity 160, and optionally back end servers 170. The host OS includes a host software design kit (SDK) 122 and a file system 124. The ISV entity 160 includes an AV application and AM kit 162. The storage device 130 includes firmware 132, firmware 134, and trusted application programming interface (API) 136. The storage device 130 may also include a system on chip (SoC) 140, memory 142 (e.g., DDR), and memory 150 (e.g., non-volatile memory, NAND, etc.). The memory 150 may include secure storage 152 and master boot record (MBR) lock 154 that provides MBR protection (e.g., using MBR shadow from Opal). The secure storage 152 may store various type of information that needs to be secure from AM attacks. The information may include signature database, file hashes, password protection, etc.

Embodiments of the invention use standards like Opal, Trusted Send/Trusted Receive (ATA), Security Protocol Out, Security Protocol In (SCSI) the Trusted Computing Group (TCG) Storage communication protocol, and the IEEE 1667 communication protocol. These standards use a similar approach for allowing a host (PC) 130 having a host application to communicate with "enhanced features" within a storage device 130 (e.g., disk drive, solid state drive, optical storage, magnetic storage, etc.). Specifically, the communication is carried over dedicated "container" commands, defined by the various storage interface standards as follows. For ATA (INCITS T13), the commands are "TRUSTED SEND" and "TRUSTED RECEIVE." For SCSI (INCITS T10), the commands are "SECURITY PROTOCOL OUT" and "SECURITY PROTOCOL IN."

While the command names are different, the command structure and content are basically the same for both ATA and SCSI. Each of these commands contains a "Protocol ID" field in the command header. Protocol IDs are assigned by T10/T13 to external organizations that want to expose a feature (or set of features) within storage devices, and need to have a way to communicate with that feature. An organization that has been assigned a Protocol ID is responsible for defining the payload of the container commands and how the payloads affect the enhanced features within the device. For example, TCG owns Protocol IDs 0x01-0x06 and IEEE 1667 owns Protocol ID 0xEE. Opal provides the ability to have secure storage 152 inside the drive, which requires authenticating an Opal user before the store can be accessed. As described above, the security protocols above are container commands for sending and receiving information from host to device and vice versa.

Storage firmware owns the data inside the storage device. Storage devices have a micro-controller/processing unit, which is responsible for managing input/output (I/O) with the device. The host initiates communication with the storage device using the communication protocols described above (e.g., Trusted Send/Receive, Security Protocol in/out) and request sectors (e.g., logical block addressing (LBA) in Solid State Drives). The firmware validated the payloads to ensure this is from a trusted source using the keys, which are stored in the secure storage 152. In case of a host 110 wanting trusted reads of sector data from the storage device, the host sends the payloads with appropriate encryption and/or signing with the sector addresses and number of sectors to read. Then, the firmware authenticates the payload and sends the requested sector data. Additionally, the firmware encrypts and adds authentication codes to the payload. In case of writes, the sequence is similar except that the host sends an additional communication command to receive the status of the previously executed Trusted write operation.

Malware can attack a MBR (Master Boot Record) and the malware loads itself into memory before the operating system loads. Opal provides a mechanism called "MBR shadow" which prevents MBR from being attacked by requiring an Opal user to authenticate to the storage device before the "real" operating system is loaded. The host SDK 122 is responsible for providing a higher level interface to the authorized ISV such as TrustedRead, TrustedWrite, SecureStoreRead, etc. In addition, the SDK, takes the data from the higher level interface and converts it to the communication protocol expected format.

The AV/AM software of the ISV is responsible for securely communicating with the storage device. This software deciphers the file to sector association and sends appropriate requests to the storage device using the communication protocols. The backend servers 170 may be used for provisioning keys into the device for authentication and encryption purposes, setting and receiving data from the secure storage, and setting and receiving trusted block level data when the ISV performs a remote scan.

In one embodiment, a system (e.g., 110) includes an operating system (e.g., 120) for performing operations on the system and a storage device (e.g., 130) to communicate with the operating system. The storage device includes firmware (e.g., 132, 134) to establish at least one trusted communication channel (e.g., 180) with an endpoint (e.g., 120, 160, 170) having software and memory (e.g., 142, 150) having secure storage. The firmware can redirect sector requests from the endpoint to secretly and securely access one or more sectors of memory, which malware may be attempting to hide. The endpoint may include an external entity that provides anti-virus/anti-malware protection. The endpoint may be part of the operating system or include a host anti-virus/anti-malware software application. The storage device receives messages from the endpoint with the messages including read/write messages and special communications including negative LBA commands. At least one trusted communication channel is established by setting up a shared key between the endpoint and the firmware. The secure storage may be accessed only by an authenticated user.

The firmware establishes at least one trusted communication channel with the endpoint by selectively establishing at least one of a first communication channel, a second communication channel, and a third communication channel based on any of the methods for establishing communications disclosed herein. For example, any of the communication channels may be established using a Trusted Send/Receive protocol or other trusted protocols disclosed herein. Alternatively, any of the communication channels may be established at the firmware level to redirect reads/writes to secretly access regions of the storage device that malware may be attempting to hide. The one or more communication channels can be established based on preferences (e.g., ISV preferences, user preferences), defaults, or current conditions such as current malware knowledge (e.g., malware knowledge provided by storage device, malware knowledge of the ISV) for the system, OS, and storage device. The ISV or user can establish a first communication channel for a first condition, a second communication channel for a second condition, a third communication channel for a third condition, a combination of communication channels for a fourth condition, etc. The ISV or user can then switch to a different communication channel or combination of channels based on new conditions or malware knowledge. In an embodiment, a storage device 130 includes a controller (e.g., microcontroller, processing unit) 138 to manage input/output operations for the storage device. Firmware (e.g., 132, 134) is communicatively coupled to the controller, which may be integrated with the firmware or external from the firmware. The firmware establishes a secure communication channel with an authorized entity (e.g., external entity with higher level of security, host OS with lower level of security). Memory (e.g., 142, 150) is communicatively coupled to the controller. The memory includes secure storage. The authorized external entity communicates with the firmware to configure monitoring for regions of the memory. The firmware sends activity data that is associated with the monitored regions of memory to the authorized external entity. The firmware is notified by the authorized external entity of available unallocated regions of memory. The firmware in cooperation with the authorized external entity provides protection for the available unallocated regions of memory. The authorized external entity communicates with the firmware to configure protection for regions of the memory including a region 154 that stores a master boot record. The firmware provides protection for the secure storage 152 to enhance security with the secure storage storing a signature database, file hashes, and passwords. The firmware may optionally establish an additional secure communication channel with the authorized external entity via an out-of-band channel using PCI I/O functions or other out-of-band I/O in combination with extended firmware features as an alternate trusted communications channel to the storage subsystem.

Figure 2:
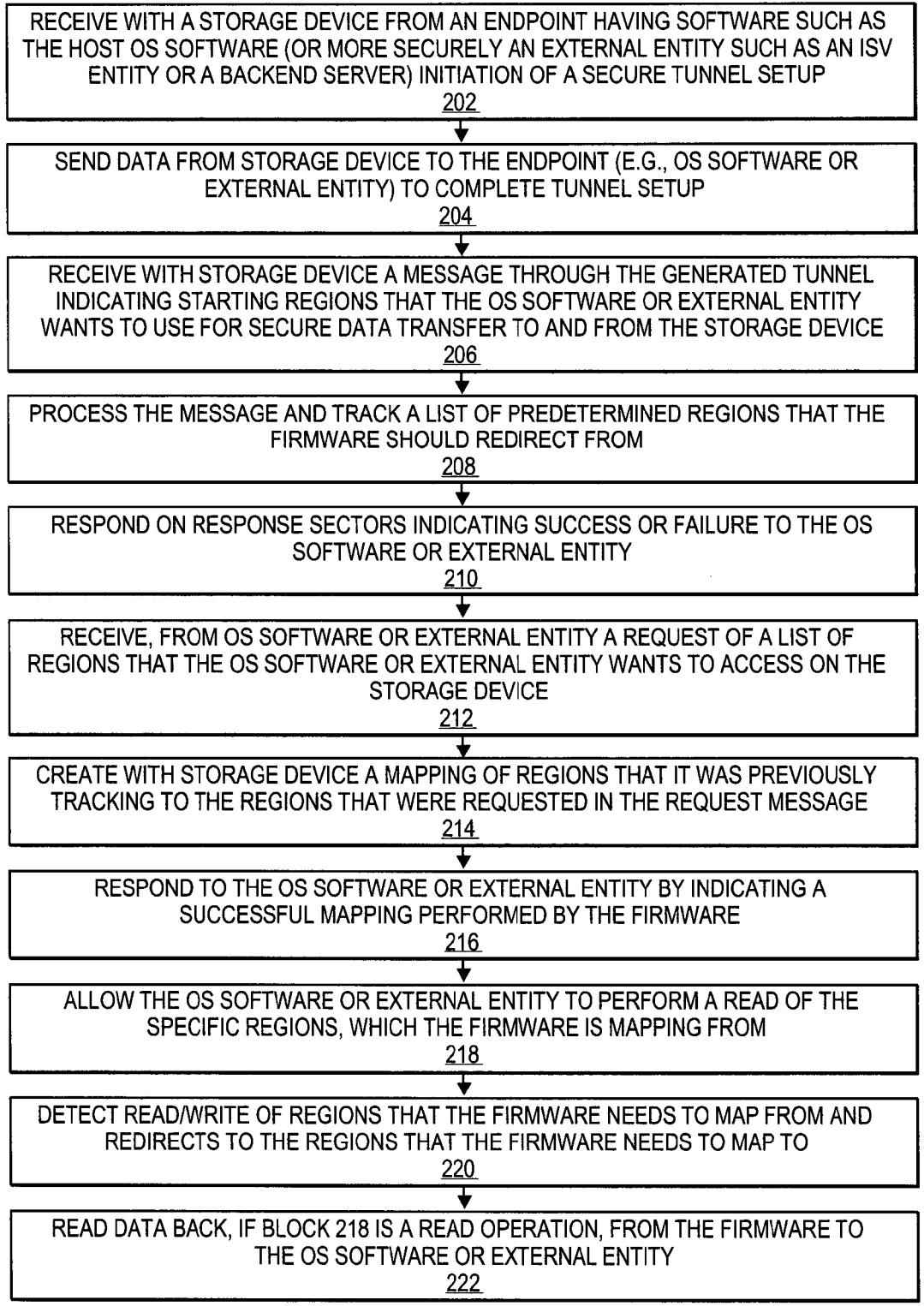
FIG. 2 illustrates a flow diagram of one embodiment for a computer-implemented method of redirections of reads/writes for accessing a storage device in accordance with one embodiment of the invention.

FIG. 2 illustrates a flow diagram of one embodiment for a computer-implemented method 200 of redirections of reads/writes for accessing a storage device in accordance with one embodiment of the invention. The method 200 is performed by processing logic that may include hardware (circuitry, dedicated logic, etc.), software (such as is run on a general purpose computer system or a dedicated machine or a device), or a combination of both. In one embodiment, the method 200 is performed by processing logic (e.g., firmware) associated with the devices or systems discussed herein.

Recent trends in malware development have included redirection of file system level file requests to be redirected to LBAs, which contain a clean copy of an infected file. The next development is to redirect specific LBA requests based on a specific malware's understanding of where it is storing its own malware payload. In order to be persistent across power cycles, the malware must be stored on permanent storage such as a hard disk drive (HDD) or a solid state drive (SSD). If a specific kernel level malware were to see a read request for specific LBAs that it knows contains its malware code, it could change the LBAs being requested to be somewhere else, which may contain clean data, and the OS would not know that any change had occurred.

In order to combat attempts by malware to hide itself and to otherwise change the operating system behavior, the firmware may employ a method of LBA redirection that is controlled by secure (encrypted) messaging. This method of redirection helps to hide specific LBA requests by communicating to firmware of a storage device in a secure manner (e.g., via signing and encryption).

At block 202, firmware of the storage device receives from an endpoint having software such as the host OS software (or more securely an external entity such as an ISV entity or a backend server that is monitored by IT) initiation of a secure tunnel setup by writing to a specific set of LBAs. The firmware responds with data needed for the endpoint (e.g., OS software or external entity) to complete tunnel setup via the OS software or external entity doing a read of specific response regions at block 204. The storage device receives a message through the generated tunnel indicating starting regions (e.g., LBAs) that the OS software or external entity wants to use for secure data transfer to and from the storage device at block 206. The firmware processes the message and tracks a list of predetermined regions (e.g., LBAs) that the firmware should redirect from at block 208. The predetermined regions (e.g., LBAs) are configured as often as the caller wants to be redirected to the areas that the caller wants to securely read from. The firmware responds on response regions indicating success or failure to the OS software or external entity at block 210. The storage device receives from OS software or external entity a request of a list of regions (e.g., LBAs) that the OS software or external entity wants to access on the storage device at block 212. At block 214, the firmware of the storage device creates a mapping of regions (e.g., LBAs) that it was previously tracking to the regions (e.g., LBAs) that were requested in the request message at block 212. The firmware responds to the OS software or external entity indicating a successful mapping performed by the firmware at block 216. The firmware allows the OS software or external entity to perform a read of the specific regions (e.g., LBAs), which the firmware is mapping from at block 218. The firmware detects read/write of regions (e.g., LBAs) that the firmware needs to map from and redirects to the regions (e.g., LBAs) that the firmware needs to map to at block 220. The data is read back, if block 218 is a read operation, from the firmware to the OS software or external entity at block 222. This data includes data for regions (e.g., LBAs) that the firmware is mapping to at block 220.

Once the firmware makes these redirections, each LBA slot can be considered a channel to access potentially infected data or data that is known to be clean. The firmware of the storage device by performing the redirection is operating beyond the bounds of the OS and is free from the direct influence of any OS based malware. The caller would then make read requests to these predetermined regions (e.g., LBAs) and in effect be doing a read of the potentially infected region (e.g., LBAs) data without the OS, malware, or anyone else (aside from the caller and the firmware) knowing that this specific data is being pulled from the firmware.

Figure 3A:
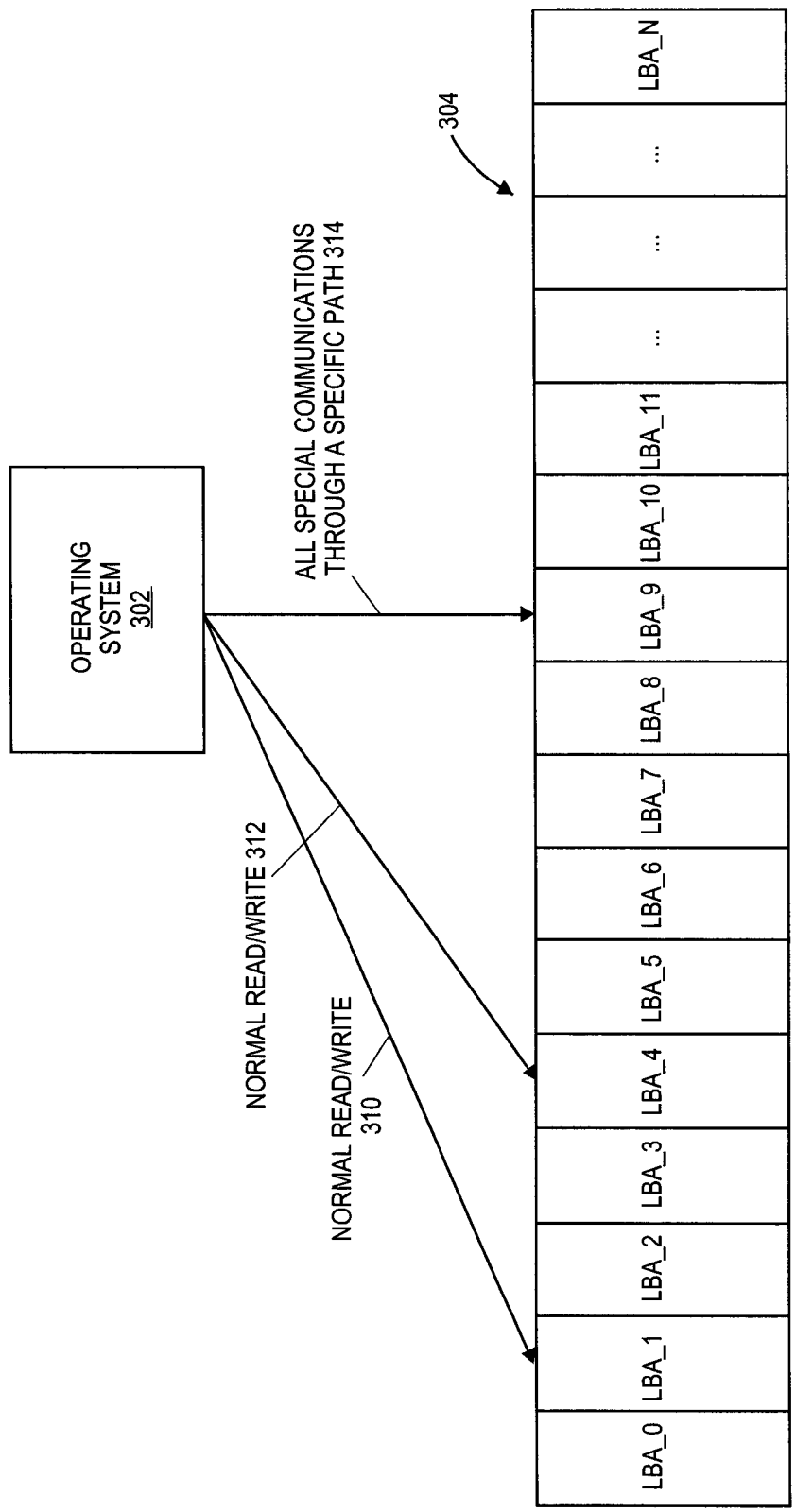
FIGS. 3A and 3B are block diagrams that illustrate securing and abstracting communications in accordance with one embodiment of the invention.
Figure 3B:
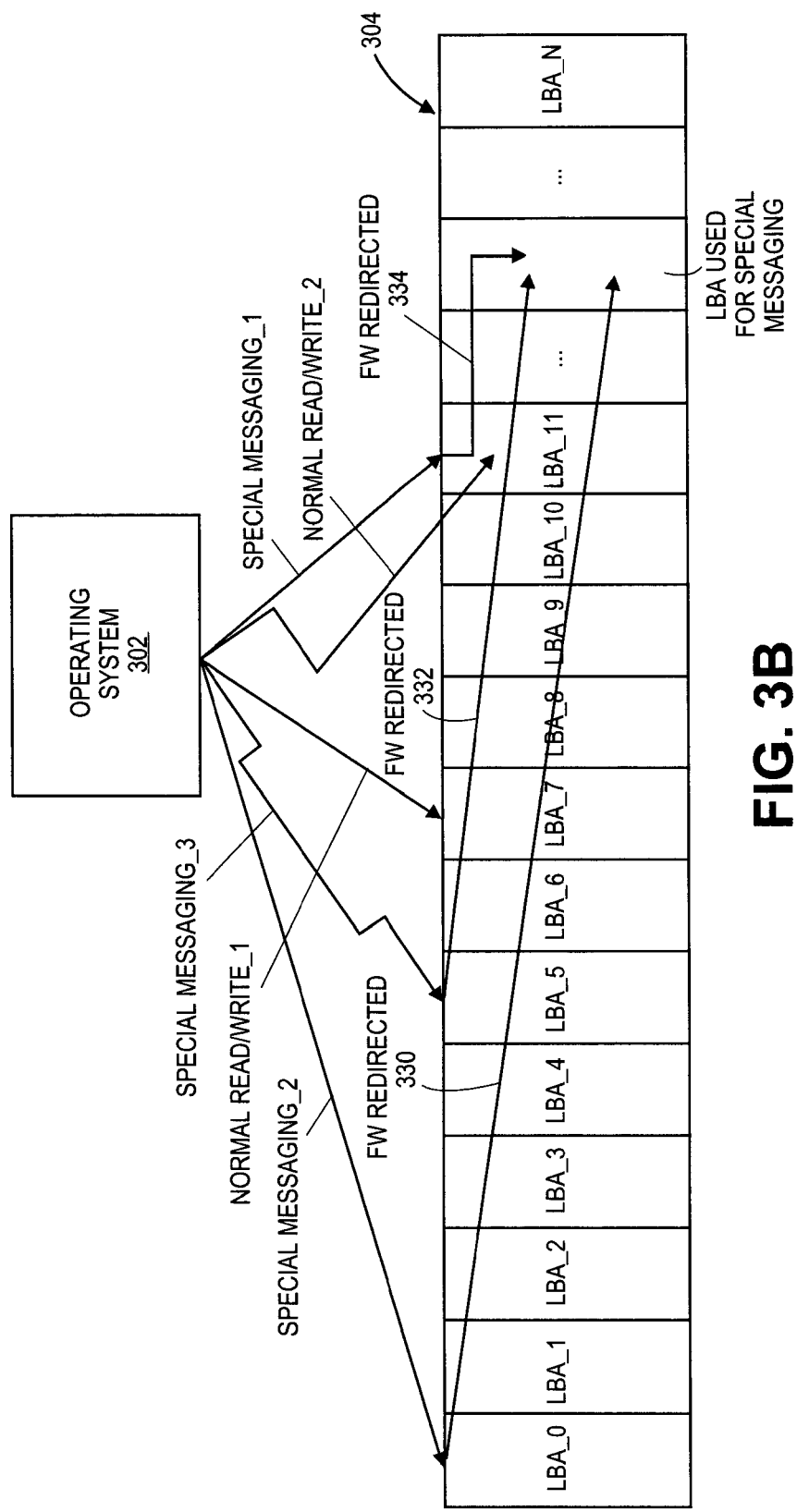

FIGS. 3A and 3B are block diagrams that illustrate securing and abstracting communications in accordance with one embodiment of the invention. The secure and abstract communications occur between an OS or external entity 302 and a storage device 304 with a usage defined protocol. The communications include encrypted logical block addresses and/or operation commands within a secure tunnel. Currently, there are many problems with malware subverting any attempts to detect malware stored on a storage device. The root cause is simply that the malware itself can detect when an attempt to read infected files associated with a specific piece of malware occurs and thwart detection by switching out the infected files with its clean versions of the files, which the malware stores somewhere else on the storage device potentially. By hiding any remnant of an actual read of the potentially infected files, malware will not be able to perform a man-in-the-middle between antivirus software and a storage device (e.g., SSD, HDD).

To thwart subversion by malware, hiding actual requests may be implemented along with any actual secure read or write calls between software running on an OS and the firmware. Creating a secure tunnel, which includes setting up a shared key for encryption between a piece of software (or more securely, an end point outside of the Operating System such as an external server) and firmware, can be used to encrypt the actual calls being made themselves.

Referring to FIG. 3A, the block diagram illustrates using methods of messaging (e.g., normal read/write 310, normal read/write 312, special communications 314) via read and write calls to specific LBAs (e.g., LBA_1, LBA_4, LBA_9). The special communications 314 may include special SATA commands and negative LBA commands (e.g., commands for storage device). The calls include control data and encrypting this data as well as the LBAs being read from or written to themselves will allow actual calls between software and firmware to be essentially impossible to know anything about the specifics of the actual reads/writes being made. The only specifics known regarding the calls is that there are two specific end points communicating (software end point 302 and firmware endpoint 304). This allows all communication with the firmware to have to be seen as pure communications between two specific end points rather than communication between two end points via a specific channel. An attacker cannot halt all reads and writes from a specific piece of software because that would be easily detectable. This concept can be utilized in many other areas as well, such as end to end communications between two applications on a network. The actual ports being used themselves can be hidden via encryption of the port value itself.

Referring to FIG. 3B, the messages that the storage device 304 receives from the OS 302 includes normal read/writes_1-3 and special messaging_1-3. When the LBA used for communication is encrypted with random padding, communications can appear as normal reads and writes to random places on the storage device. This makes it difficult to distinguish which of the reads/writes are special communications and which ones are normal reads/writes. The storage device uses decryption to determine if a specific read/write LBA is meant to be redirected to a LBA used for special messaging as indicated with redirect firmware (FW) messages 330, 332, and 334. FIGS. 2, 3A, and 3B illustrate a scheme in which a secure tunnel is established by overloading with normal reads/writes.

Figure 4:
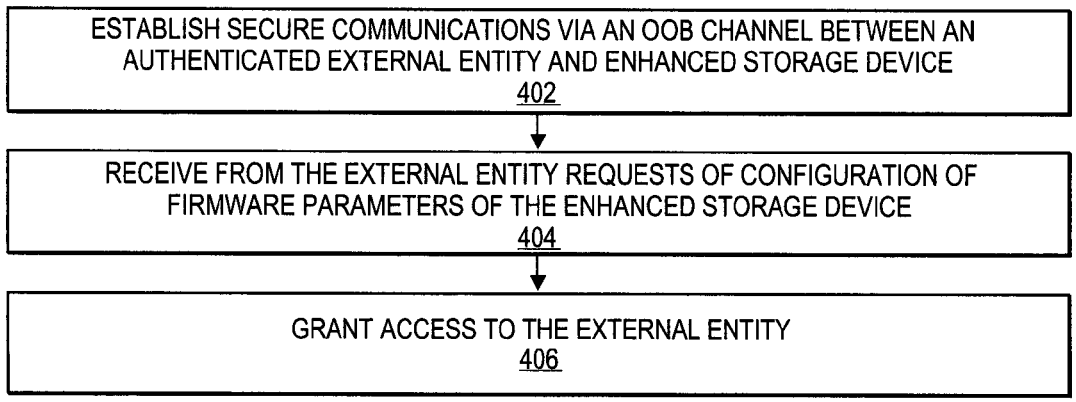
FIG. 4 illustrates a flow diagram of one embodiment for a computer-implemented method for secure out-of-band (OOB) communications for accessing a storage device in accordance with one embodiment of the invention.

FIG. 4 illustrates a flow diagram of one embodiment for a computer-implemented method 400 for secure out-of-band (OOB) communications for accessing a storage device in accordance with one embodiment of the invention. The method 400 is performed by processing logic that may include hardware (circuitry, dedicated logic, etc.), software (such as is run on a general purpose computer system or a dedicated machine or a device), or a combination of both. In one embodiment, the method 400 is performed by processing logic associated with the devices or systems discussed herein.

At block 402, an enhanced storage device establishes secure communications via an OOB channel with an authenticated external entity. At block 404, the storage device receives from the external entity (e.g., ISV entity, server) requests of configuration of firmware parameters of the enhanced storage device. At block 406, the storage device grants access to the external entity.

An additional potential feature to enable security against malware threats is to have a separate OOB communication with a storage device. Currently, communications between a storage system such as an SSD and the host are confined to a single channel like SATA and securing communications over the single channel is difficult. Embodiments of this invention enhance the security of storage device communications by exposing PCI I/O functions or other out-of-band I/O in combination with extended firmware features as an alternate trusted communications channel to the storage subsystem. Firmware enhancements for secure communications can be employed over one or multiple channels to provide a deeper level of security for combating malware and for enforcing access controls.

Figure 5:
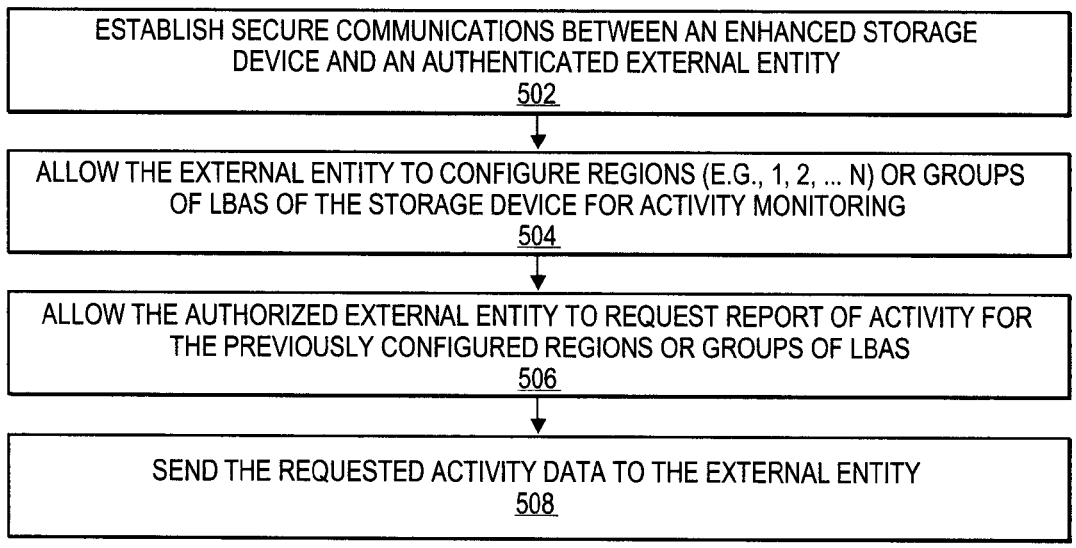
FIG. 5 illustrates a flow diagram of one embodiment for a computer-implemented method for firmware-base storage space monitoring in accordance with one embodiment of the invention.

FIG. 5 illustrates a flow diagram of one embodiment for a computer-implemented method 500 for firmware-base storage space monitoring in accordance with one embodiment of the invention. The method 500 is performed by processing logic that may include hardware (circuitry, dedicated logic, etc.), software (such as is run on a general purpose computer system or a dedicated machine or a device), or a combination of both. In one embodiment, the method 500 is performed by processing logic associated with the devices or systems discussed herein.

Currently, anti-malware focuses on monitoring and scanning known files that reside within the filesystem, but a problem exists in that malware often takes advantage of the fact that anti-malware scanning is often infrequent. To address this problem, features provided in firmware can provide the method 500 for monitoring activity for groups of statically or dynamically defined regions (e.g., LBAs) within storage control firmware and for providing reports on any activity associated with these defined regions (e.g., LBAs). In addition to containing features for controlling storage media, the storage control firmware would be extended to contain additional features provided by the method 500.

At block 502, an enhanced storage device establishes secure communications with an authenticated external entity. At block 504, the storage device allows the external entity to configure regions (e.g., 1, 2, ... n) or groups of LBAs of the storage device for activity monitoring. At block 506, the storage device allows the authorized external entity to request reports of activity for the previously configured regions or groups of LBAs. At block 508, the storage device sends the requested activity data to the external entity.

Figure 6:
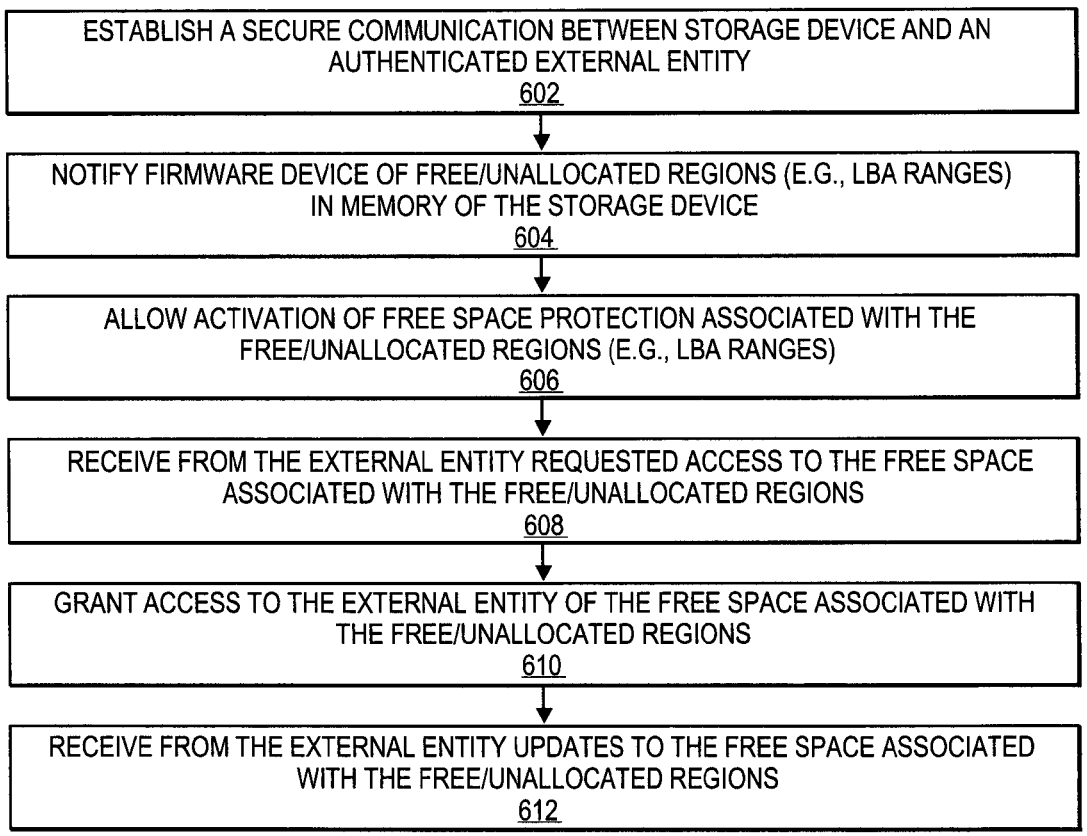
FIG. 6 illustrates a flow diagram of one embodiment for a computer-implemented method for firmware-based free space protection of a storage device in accordance with one embodiment of the invention.

FIG. 6 illustrates a flow diagram of one embodiment for a computer-implemented method 600 for firmware-based free space protection of a storage device in accordance with one embodiment of the invention. The method 600 is performed by processing logic that may include hardware (circuitry, dedicated logic, etc.), software (such as is run on a general purpose computer system or a dedicated machine or a device), or a combination of both. In one embodiment, the method 600 is performed by processing logic associated with the devices or systems discussed herein.

At the present time, protection schemes for non-volatile storage focus primarily on scanning and protecting known files and used regions within a given file system. Unfortunately, this approach is problematic in that malware often takes advantage of the fact that large portions of storage are flagged as unallocated or free, and are therefore not scanned with regularity. Embodiments of the invention provide firmware features in cooperation with the operating system to protect unallocated or unused regions of storage from unauthorized use. Using features that extend storage control firmware such that a secure communications channel is available to an authenticated external entity, and a means of dynamically designating protected regions (e.g., ranges of LBAs), the OS or other authenticated entity can operate cooperatively to lock down unused or unallocated storage space. When a need for storage arises with normal legitimate use of the system, the OS or other authenticated external entity and firmware can cooperate through a secure communications channel to grant permissions for use of the free or unallocated space that has been locked down to prevent an attack from malware. The authenticated external entity may initially cooperate with the firmware to establish secure communications and grant permissions while at a later time the host OS may cooperate with the firmware to grant these permissions.

At block 602, an enhanced storage device establishes secure communications with an authenticated external entity. At block 604, the firmware is notified by the external entity device of free/unallocated regions (e.g., LBA ranges) in memory of the storage device. At block 606, the firmware allows activation of free space protection associated with the free/unallocated regions (e.g., LBA ranges). At block 608, the firmware receives from the external entity requested access to the free space associated with the free/unallocated regions (e.g., LBA ranges). At block 610, the storage device grants access to the external entity of the free space. At block 612, the firmware receives from the external entity updates to the free space associated with the free/unallocated regions (e.g., LBA ranges).

Figure 7:
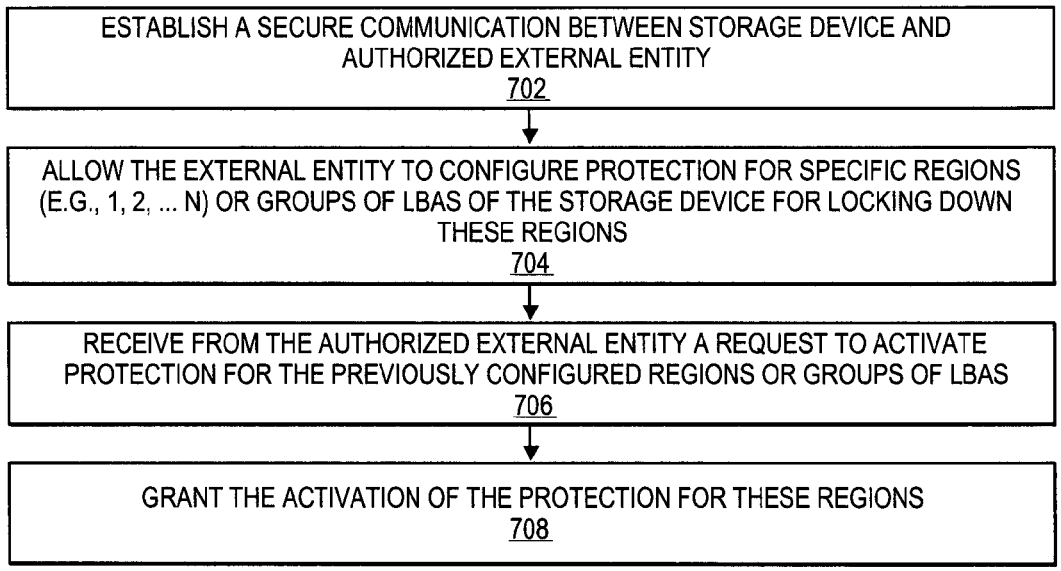
FIG. 7 illustrates a flow diagram of one embodiment for a computer-implemented method for firmware-based lockdown of key regions of a storage device in accordance with one embodiment of the invention.

FIG. 7 illustrates a flow diagram of one embodiment for a computer-implemented method 700 for firmware-based lockdown of key regions of a storage device in accordance with one embodiment of the invention. The method 700 is performed by processing logic that may include hardware (circuitry, dedicated logic, etc.), software (such as is run on a general purpose computer system or a dedicated machine or a device), or a combination of both. In one embodiment, the method 700 is performed by processing logic associated with the devices or systems discussed herein.

Currently there is a security problem in that even if software based full disk encryption is used, an attacker could potentially modify the encryption software used for encryption to continue to look like legitimate software. However, in addition to unencrypting the disk drive so a normal user can use the system, the infected encryption software would also have a way of storing the password (or passphrase) that the user types so that an attacker can come back later and have the encryption passphrase waiting for them. Alternatively, the attacker can have the encryption passphrase e-mailed to him. This would result in all data on the system still being compromised with basically two attacks on a system instead of just one (e.g., just accessing the unencrypted data if it is not encrypted and copying it to a removable media). An administrator or user can lock their own executables down so that unauthorized attempts to write to the storage device will fail. The firmware-based lockdown has the ability to lock down certain areas of the storage device so that the firmware itself does not allow access to change those specific areas (e.g., MBR, VBR, and the partition that the disk encryption software resides in) and also allow access via an API to the OS and/or the disk encryption software. The software will be locked from being changed unless the write attempts are authorized via any number of authentication mechanisms (e.g., IT unlock password, signing from the distributor of the encryption software, signature from the distributor of the OS, etc.).

At block 702, an enhanced storage device establishes secure communications with an authorized external entity. At block 704, the storage device allows the external entity to configure protection for specific regions (e.g., 1, 2, ... n) or groups of LBAs of the storage device for locking down these regions. At block 706, the storage device receives from the authorized external entity a request to activate protection for the previously configured regions or groups of LBAs. At block 708, the storage device grants the activation of the protection for these regions.

In one embodiment, the firmware lockdown of key assets enhances the security of a host system by preventing changes to the OS bootstrap code. The first 8 LBAs may include the MBR and also disk encryption software, which is the first to boot at start up of the system. These LBAs can be protected from normal writes via firmware protection. In this case, only authenticated writes to the LBAs will allow LBAs to be changed in order to perform updates.

Figure 8:
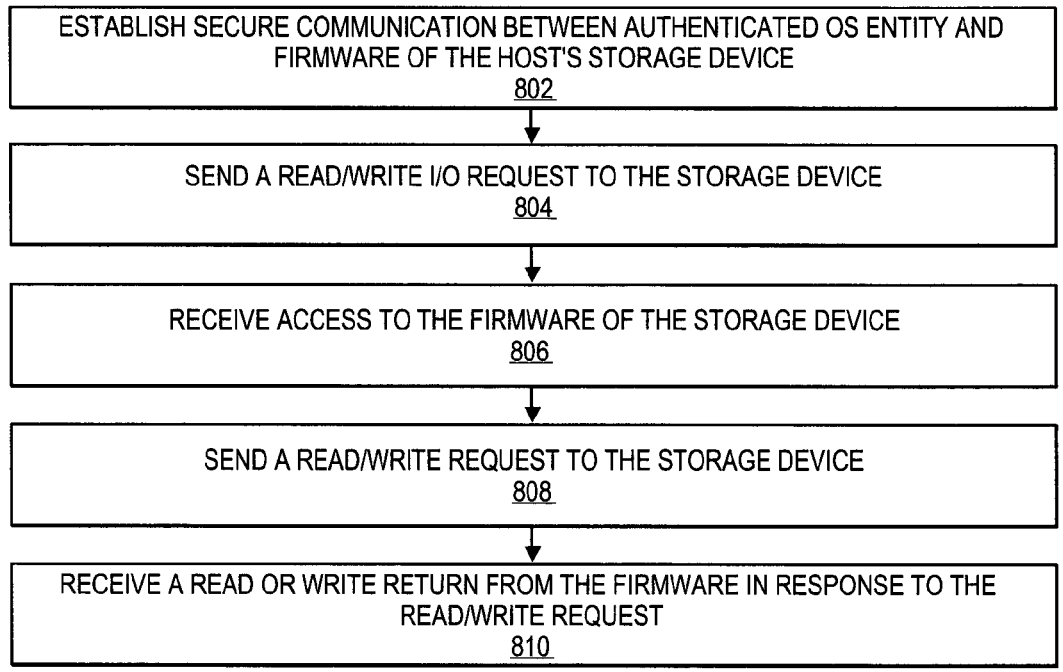
FIG. 8 illustrates a flow diagram of one embodiment for a computer-implemented method for performing trusted input/output (I/O) operations via integration between a host OS and firmware of the host's storage device in accordance with one embodiment of the invention.

FIG. 8 illustrates a flow diagram of one embodiment for a computer-implemented method 800 for performing trusted input/output (I/O) operations via integration between a host OS and firmware of the host's storage device in accordance with one embodiment of the invention. The method 800 is performed by processing logic that may include hardware (circuitry, dedicated logic, etc.), software (such as is run on a general purpose computer system or a dedicated machine or a device), or a combination of both. In one embodiment, the method 800 is performed by processing logic associated with the devices or systems discussed herein.

Currently, I/O operations originating at an OS level of the host do not have an established root of trust, and in turn, are not always trustworthy. The method 800 establishes a root of trust between the OS and storage control firmware, in addition to trusted exchanges between the OS and storage control firmware to ensure that all I/O operations are trusted I/O operations.

At block 802, an authenticated OS entity (e.g., host OS) establishes secure communications with firmware of the host's storage device. At block 804, the authenticated OS entity sends a read/write I/O request to the storage device. At block 806, the authenticated OS entity in response to the read/write I/O request receives access to the firmware of the storage device. At block 808, the authenticated OS entity sends a read/write request to the storage device. At block 810, the host OS receives a read or write return from the firmware in response to the read/write request.

Current approaches operate at the host level and do not provide the anti-malware agent any privileges over the malware. The enhanced storage device and the described features provide a means to provide higher privileges to the anti-malware agent.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
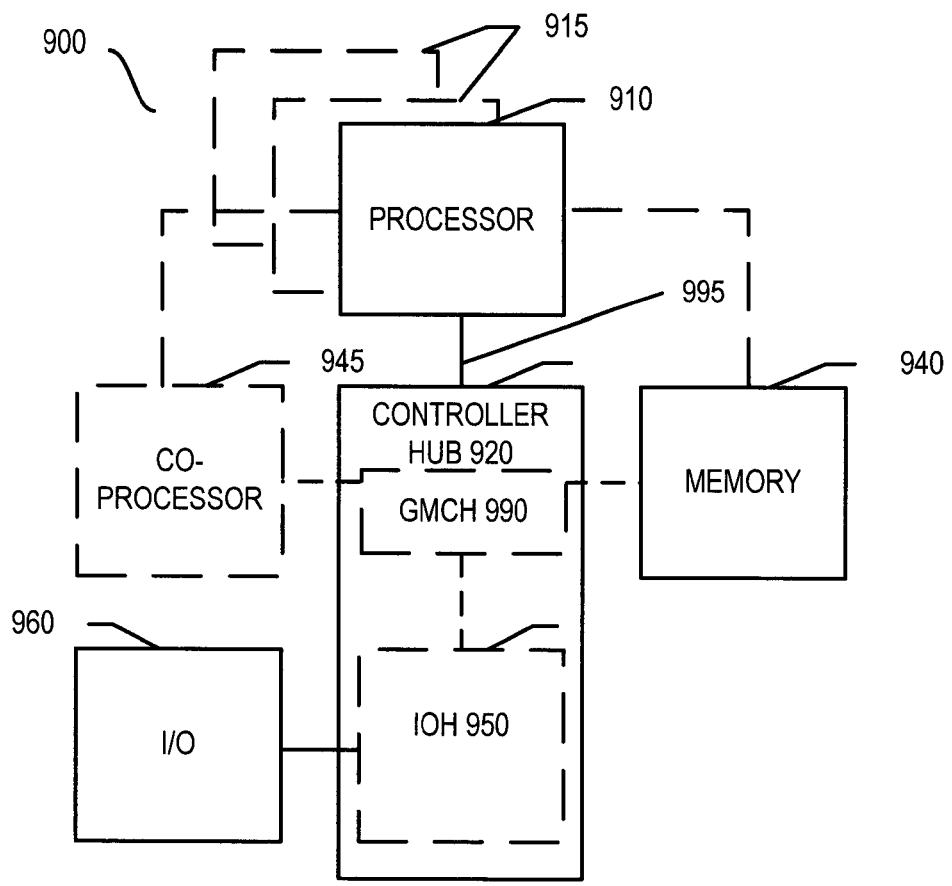
FIG. 9 is a block diagram of a system in accordance with one embodiment of the invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950. The GMCH 990 may also be coupled to a storage device (e.g., storage device 130, non-volatile memory) as discussed herein.

The optional nature of additional processors 915 is denoted in FIG. 9 with broken lines. Each processor 910, 915 may include one or more of the processing cores described herein.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
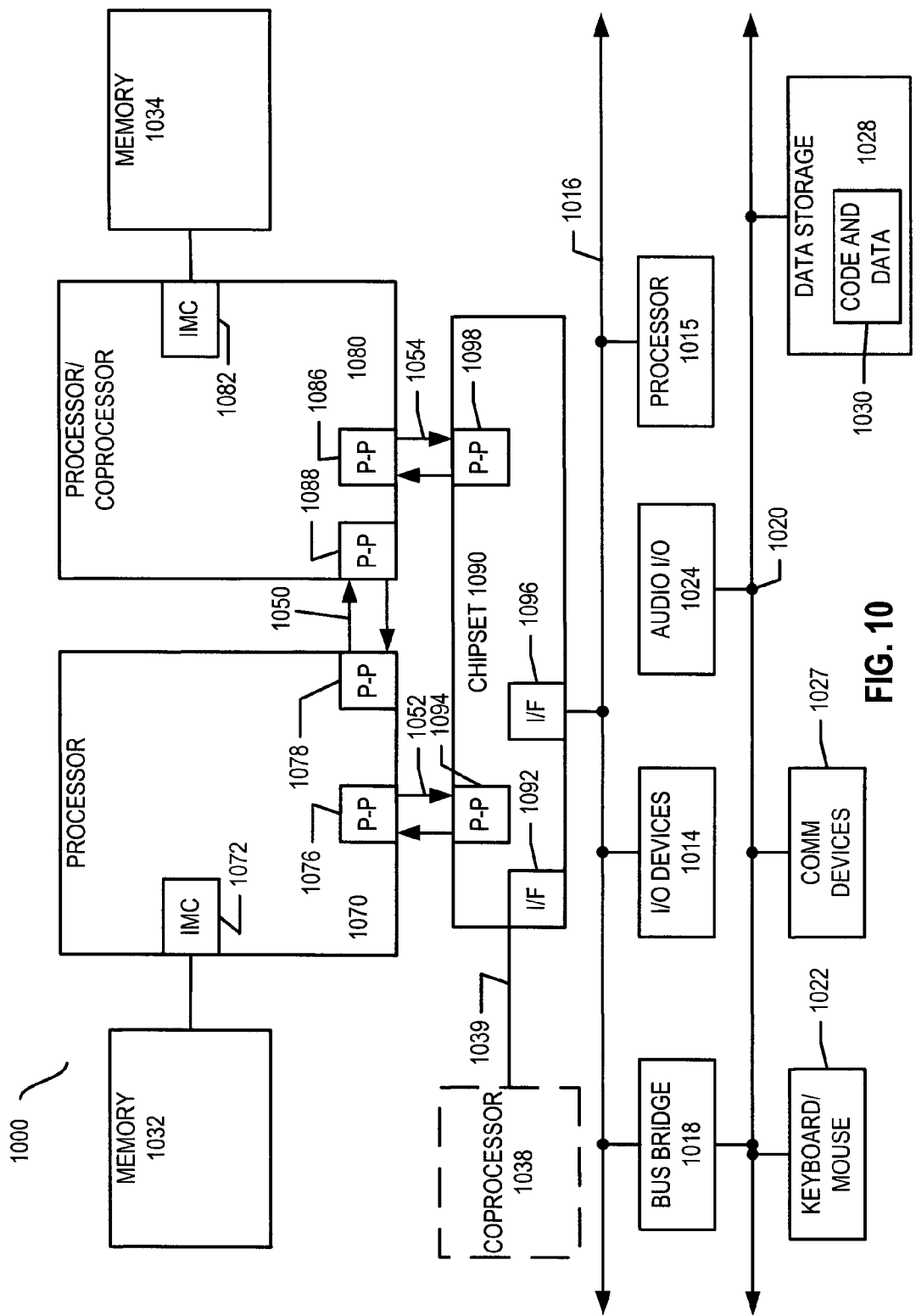
FIG. 10 is a block diagram of a second system in accordance with an embodiment of the invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. In one embodiment of the invention, processors 1070 and 1080 are respectively processors 910 and 915, while coprocessor 1038 is coprocessor 945. In another embodiment, processors 1070 and 1080 are respectively processor 910 and coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and data storage 1028 (e.g., storage device as described herein, storage device 130 of FIG. 1) such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
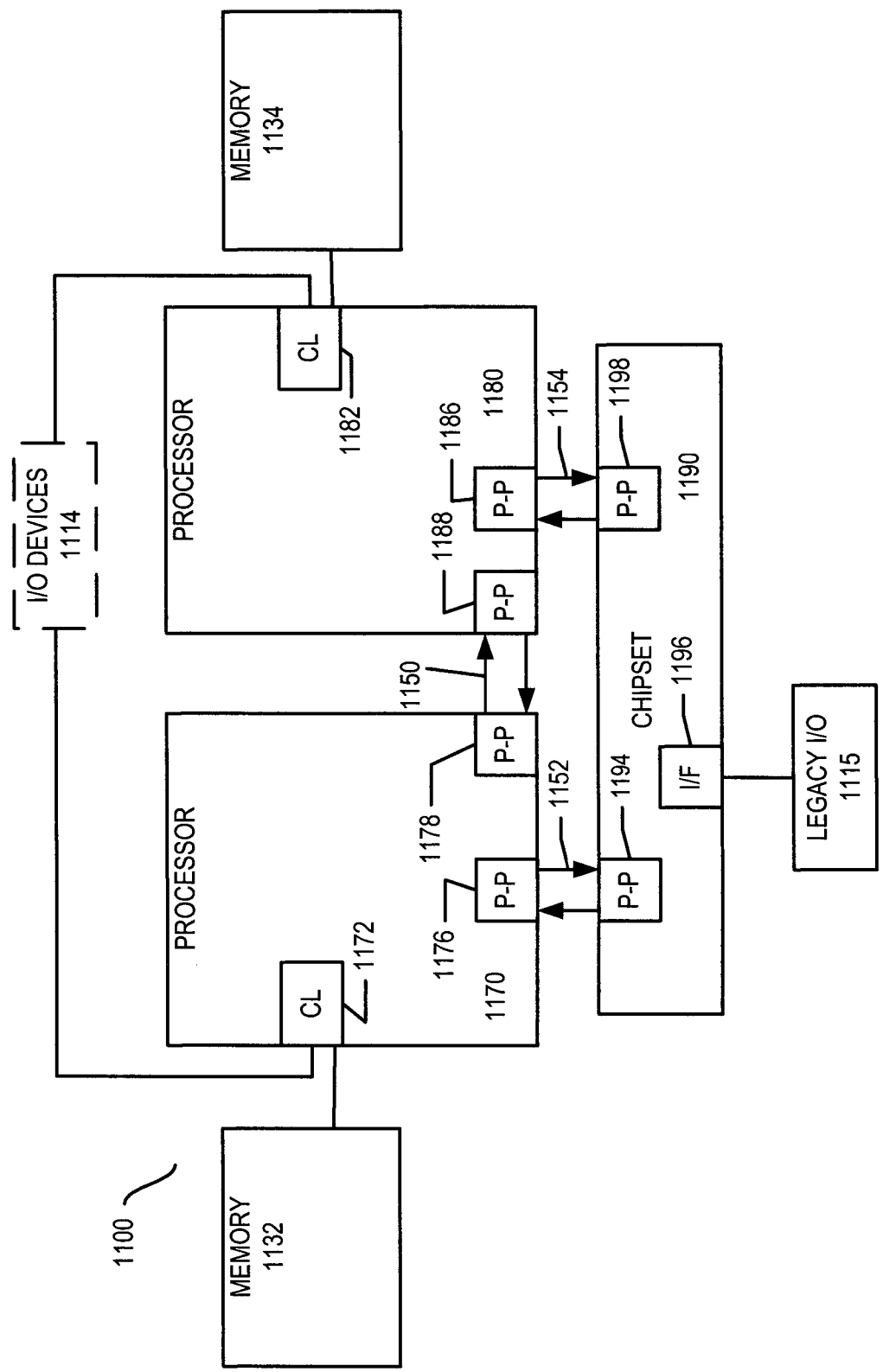
FIG. 11 is a block diagram of a third system in accordance with an embodiment of the invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11. FIG. 11 illustrates that the processors 1170, 1180 may include integrated memory and I/O control logic ("CL") 1172 and 1182, respectively. Thus, the CL 1172, 1182 include integrated memory controller units and include I/O control logic. FIG. 11 illustrates that not only are the memories 1132, 1134 coupled to the CL 1172, 1182, but also that I/O devices 1114 are also coupled to the control logic 1172, 1182. Legacy I/O devices 1115 are coupled to the chipset 1190. The memories 1132, 1134 may include non-volatile memory such as the storage device discussed herein (e.g., storage device 130 of FIG. 1).

Figure 12:
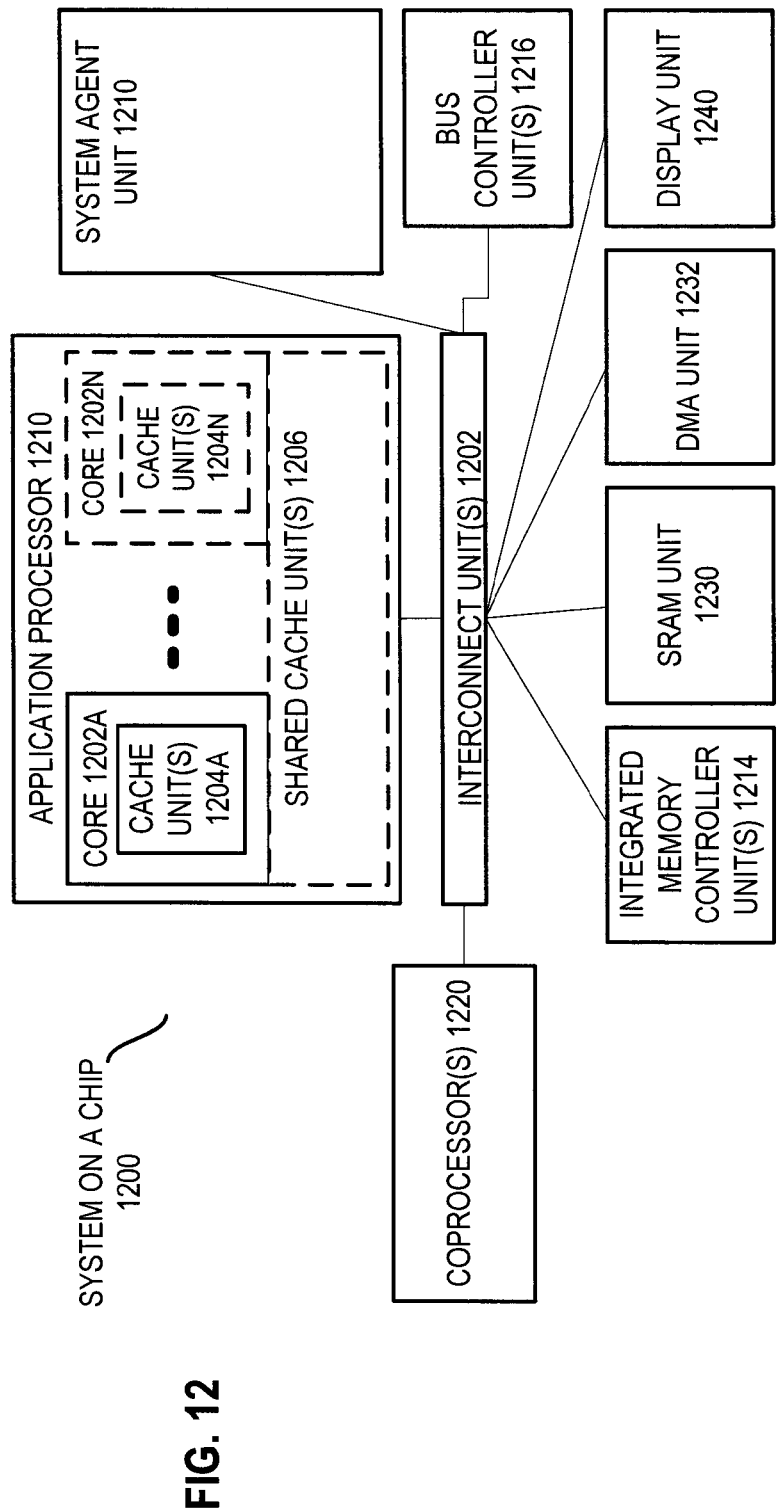
FIG. 12 illustrates a functional block diagram illustrating a system on a chip implemented in accordance with one embodiment of the invention.

Referring now to FIG. 12, shown is a block diagram of a SoC 1200 in accordance with an embodiment of the present invention. Also, dashed lined boxes are optional features on more advanced SoCs. In FIG. 12, an interconnect unit(s) 1202 is coupled to: an application processor 1210 which includes a set of one or more cores 1202A-N and shared cache unit(s) 1206; a system agent unit 1210; a bus controller unit(s) 1216; an integrated memory controller unit(s) 1214; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like. The SoC 1200 may include or be coupled to a storage device as described herein.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A system, comprising:
   an operating system to perform operations on the system;
   a storage device to communicate with the operating system, the storage device comprising,
      executable firmware to establish at least one trusted communication channel with an endpoint having software and to redirect sector requests from the endpoint to secretly and securely access one or more sectors of memory, which malware is attempting to hide, and to track a list of predetermined regions that the firmware should redirect region requests from, wherein the predetermined regions are logical block addresses (LBA);
      memory having secure storage;
      a controller to execute the firmware, wherein the storage device to receive messages from the endpoint with the messages including read/write messages and special communications including negative LBA commands.

2. The system of claim 1, wherein the endpoint is part of the operating system or comprises a host anti-virus/anti-malware software application.

3. The system of claim 1, wherein the trusted communication channel is established by setting up a shared key between the endpoint and the firmware.

4. The system of claim 1, wherein the firmware to establish at least one trusted communication channel with the endpoint comprises selectively establishing one of a first communication channel and a second communication channel or both of the first and second communication channels.

5. The system of claim 4, wherein the first communication channel is established using a Trusted Send/Receive protocol.

6. A storage device comprising:
   a controller to manage input/output operations for the storage device;
   executable firmware communicatively coupled to the controller, the firmware to establish a secure communication channel with an authorized external entity and to redirect sector requests, from an endpoint to secretly and securely access one or more sectors of memory, which malware is attempting to hide, and to track a list of predetermined regions that the firmware should redirect region requests from, wherein the predetermined regions are logical block addresses (LBA), wherein the storage device to receive messages from the external entity with the messages including read/write messages and special communications including negative LBA commands; and
   memory communicatively coupled to the controller, the memory having secure storage.

7. The storage device of claim 6, wherein the authorized external entity to communicate with the firmware to configure monitoring for regions of memory.

8. The storage device of claim 7, wherein the firmware to send activity data that is associated with the monitored regions of memory to the authorized external entity.

9. The storage device of claim 6, wherein the firmware is to be notified by the authorized external entity of available unallocated regions of memory.

10. The storage device of claim 9, wherein the firmware in cooperation with the authorized external entity to provide protection for the available unallocated regions of memory.

11. The storage device of claim 6, wherein the authorized external entity to communicate with the firmware to configure protection for regions of the memory including a region that stores a master boot record.

12. The storage device of claim 6, wherein the firmware to provide protection for the secure storage to enhance security with the secure storage storing a signature database, file hashes, and passwords.

13. The storage device of claim 6, wherein the firmware to establish an additional secure communication channel with the authorized external entity via an out-of-band channel.

14. A computer-implemented method, comprising:
   establishing secure communications via a tunnel between an authenticated external entity and firmware of a storage device;
   tracking, with the firmware, a list of predetermined regions that the firmware should redirect region requests from the external entity that is attempting to secretly and securely access one or more sectors of memory, which malware is attempting to hide, wherein the predetermined regions are logical block addresses (LBA); and
   redirecting region requests to the list of predetermined regions to be accessed on the storage device.

15. The computer-implemented method of claim 14, further comprising:
   creating, with the firmware, a mapping of the predetermined regions to the requested regions.

16. The computer-implemented method of claim 15, further comprising:
   responding, with the firmware, to the external entity with a message that indicates a successful mapping.

17. The computer-implemented method of claim 16, further comprising:
   receiving a read request for a specific region, which the firmware is mapping from.

18. The computer-implemented method of claim 17, further comprising:
   redirecting the read request based on the mapping to a predetermined region that corresponds to the read request.

* * * * *